United States Patent [19]
Schaedler et al.

[11] 3,923,429
[45] Dec. 2, 1975

[54] OVERSPEED SAFETY DEVICE FOR ROTARY TOOLS

[75] Inventors: Raymond J. Schaedler, New Hartford; Robert D. Roth, Utica, both of N.Y.

[73] Assignee: Chicago Pneumatic Tool Company, New York, N.Y.

[22] Filed: June 3, 1974

[21] Appl. No.: 475,814

[52] U.S. Cl. ............................ 418/43; 137/57
[51] Int. Cl.² ................ F01C 21/12; G05D 13/10
[58] Field of Search ...................... 418/40–43; 137/50, 57

[56] References Cited
UNITED STATES PATENTS

| | | | |
|---|---|---|---|
| 2,422,733 | 6/1947 | Jimerson | 418/43 |
| 2,586,968 | 2/1952 | Maclay | 418/43 |
| 3,071,115 | 1/1963 | Schott | 418/42 |
| 3,257,913 | 6/1966 | Broom et al. | 418/43 |
| 3,279,485 | 10/1966 | Alexander | 418/43 |
| 3,519,372 | 7/1970 | Peale | 418/43 |
| 3,767,332 | 10/1973 | Wickham et al. | 418/43 |

*Primary Examiner*—John J. Vrablik
*Attorney, Agent, or Firm*—Stephen J. Rudy

[57] ABSTRACT

A safety control mechanism operable for shutting off operating air flow to the motor of a grinding tool when the motor overspeeds beyond a rated governor controlled maximum, including a trip pin normally pressing a leaf spring valve from a closed condition to an open condition and adapted to be tripped by means of a centrifugally operable flyweight to release the valve to closed condition when the motor overspeeds, whereby operating air to the motor is shut off.

6 Claims, 3 Drawing Figures

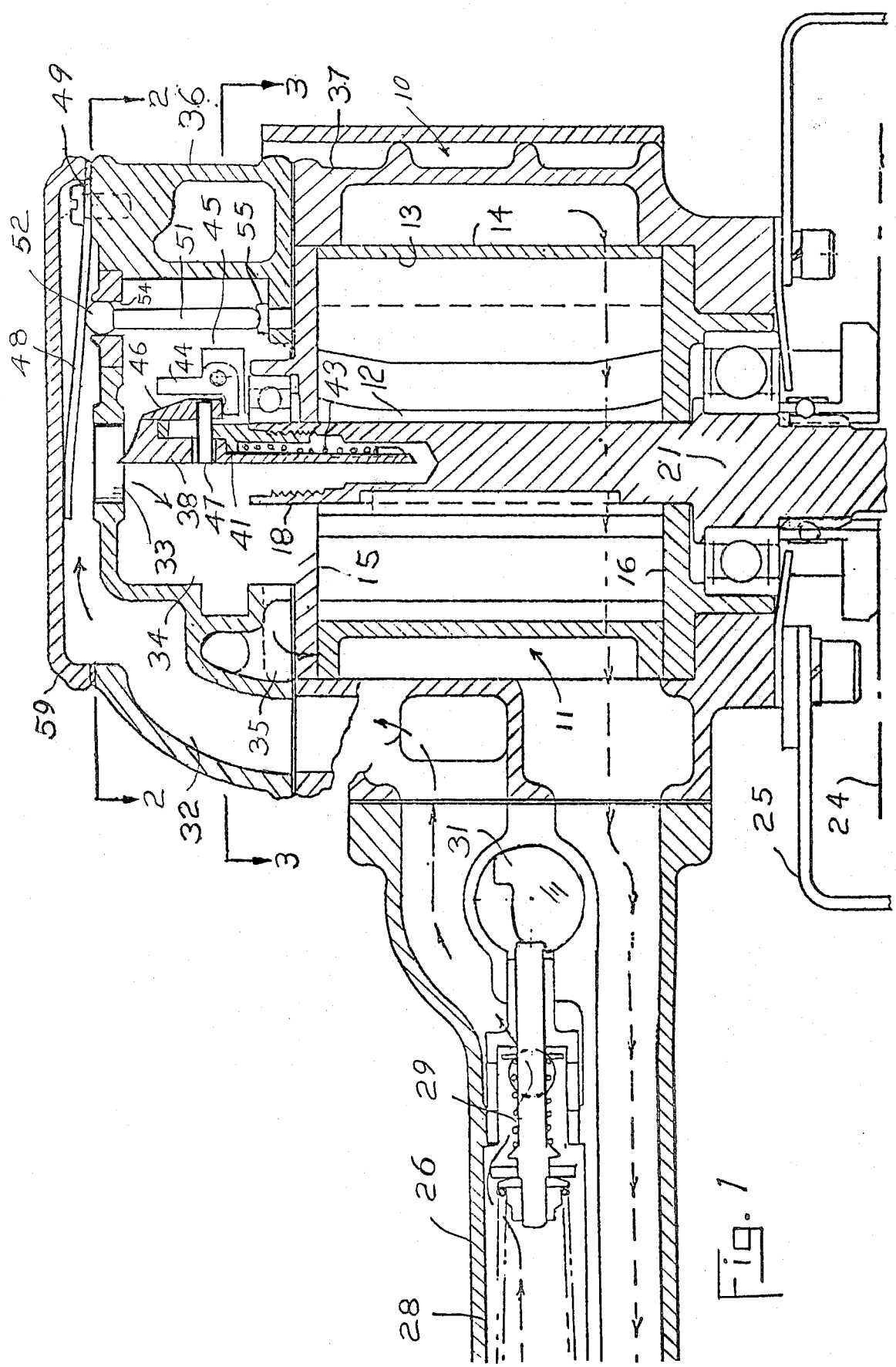

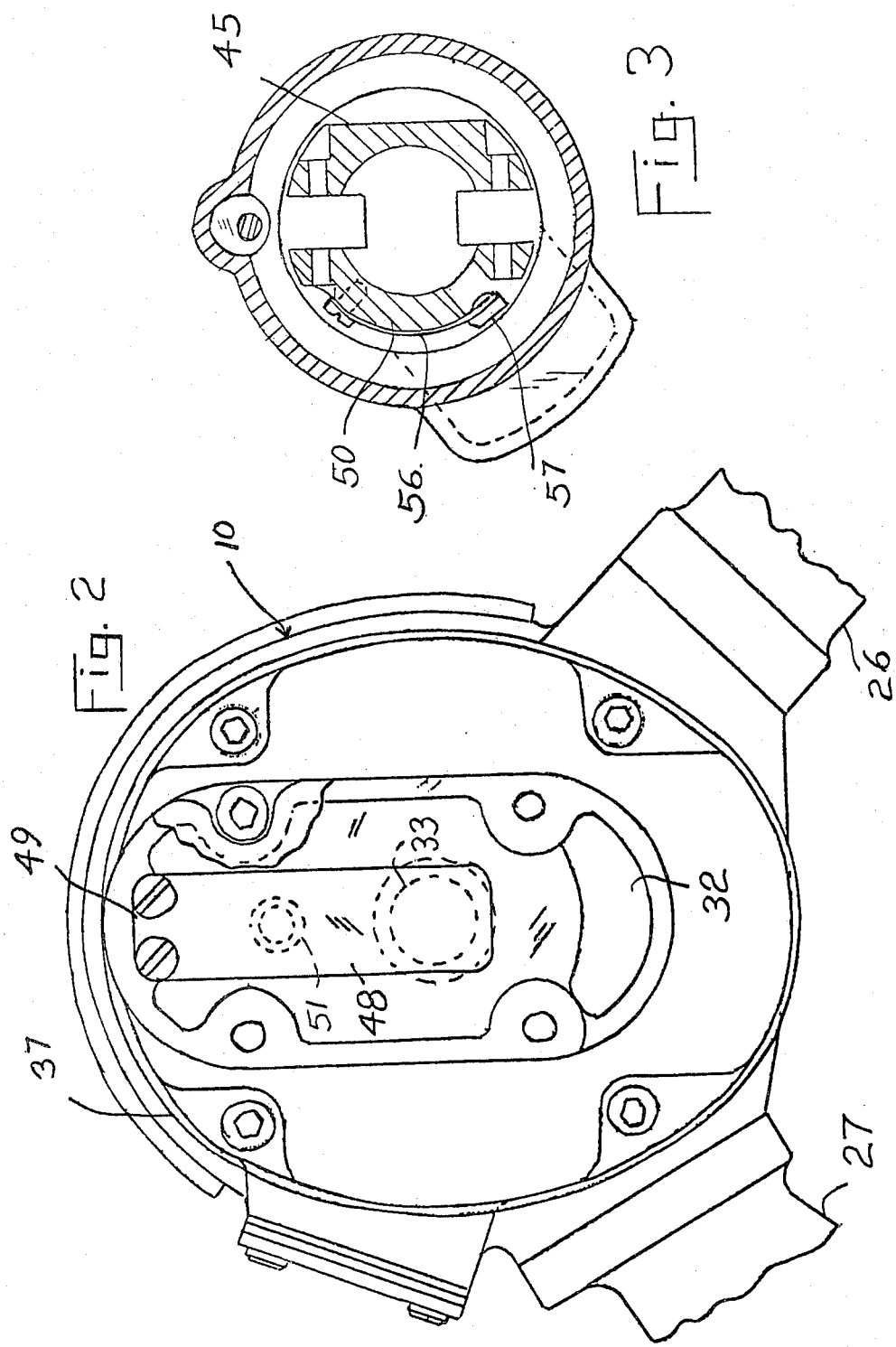

OVERSPEED SAFETY DEVICE FOR ROTARY TOOLS

BACKGROUND OF THE INVENTION

This invention is concerned with overspeed safety control mechanism for the air motor of a rotary tool. When the speed of the motor, for some reason, rises to a predetermined maximum and before it can rise further to a dangerous speed, the safety control mechanism responds automatically and shuts off operating air power to the motor, preventing further operation of the tool until the operator intervenes.

While the invention may be subject to wide and various applications, it is particularly suited for use as a component of a high-speed pneumatically powered rotary grinding tool.

An air motor in a high-speed tool, unless curbed by some suitable power control tends to accelerate to or rapidly reach a high overspeed condition which, unless stopped, could not only wreck the tool in which it is embodied, but also could be dangerous to the operator and others in the immediate area of operation.

Rotary tools having air motors are usually provided with governors which normally serve to prevent overspeeding by maintaining the speed of the motor at a safe and constant rate within a close range. However, the particular function of the governor is primarily to maintain a constant rated speed, and not to stop operation of the tool entirely. Something more is needed than the governor for safe operation of a rotary tool.

Governors may suddenly fail due to various reasons, such as wear, entry of dirt, breaking of springs or other parts as a result of operation. The normal reflexes of the operator are usually inadequate to manually stop operation of the tool in time to avoid damage or possible injury when a governor fails to operate. Accordingly, in lieu of, or in addition to a governor, something more is desired in a rotary tool for its safe operation. An automatically operating control is required which will sense a developing runaway, or overspeed condition, of the motor and then function automatically to stop further operation of the motor before damage to the tool, or injury to nearby persons, can result.

The need of a safety stop-operation motor control is especially true with respect to high-speed rotary grinding tools. These have a grinding wheel made of frangible stone material. The wheel is subjected during a grinding operation to temperature changes, varying strains, sudden torque changes, and centrifugal forces, all of which mount with increasing speed of the motor. If in such a tool, an overspeed condition were to develop out of control because of a failure of the usual governor to operate, delay in the operator's reflex actions to manually shut off the power, or for lack of an automatically operating power shut-off control, it is likely that the grinding wheel and other components of the tool could break up and fly apart, endangering those in the immediate area.

Accordingly, the general object of this invention is to provide a rotary tool, particularly a rotary grinding tool with mechanism for sensing development of an unsafe speed condition and then automatically stopping further operation of the tool until the operator intervenes and remedies the condition that caused the overspeed.

In accordance with the invention, there is provided in a rotary tool including a rotary air motor, an inlet port for admitting operating air to the motor, and a valve controlling air flow through the port to the motor, a trip releasably supporting the valve in an open normal position, the valve being constantly biased against the trip in a closing direction, the trip being located at a predetermined radial distance from the axis of the motor, and trip actuating means carried by the motor having response to a predetermined centrifugal force developed by the motor to move outwardly in a path of rotation in which the trip is located so as to cause the latter to be upset and as a consequence release its support from the valve.

In order that the invention may be fully understood and readily carried into effect, the same will now be described (by way of example only) with reference to the accompanying drawing, of which:

FIG. 1 is a sectional view of a grinding tool in which the invention is incorporated;

FIG. 2 is a section on line 2—2 of FIG. 1; and

FIG. 3 is a section on line 3—3 of FIG. 1.

Referring now to the drawings, there is shown a pneumatically powered grinding tool of the vertical type having a housing 10 in which is mounted a rotary air powered motor 11 of the slidable vane type. The motor includes a rotor 12 which is operable in a chamber 13 defined by a surrounding liner 14 and closed at opposite ends by end plates 15 and 16.

The upper end plate 15 is fitted with a bearing in which an upper end 18 of the rotor shaft is supported; and the lower end plate is fitted with a bearing in which a lower portion 21 of the rotor shaft is supported. A grinding wheel 24 (broken line) is mounted upon an externally projecting end of the rotor shaft. The usual guard 25 protectively skirts the grinding wheel.

A pair of handles 26, 27 (FIGS. 1, 2) projecting from the side area of the housing are designed to be held by the operator in maneuvering the tool over a work surface.

The handle 26 has an air inlet passage 28 connectible to an external source of pressure air for supplying operating air to the motor. A throttle valve 29 incorporated in handle 26 is selectively movable to an open or closed condition relative to the inlet passage by means of a manually operable control lever 31.

In the open throttle valve condition, supply air flows continuously through the handle and a connected housing passage 32 to a control inlet port 33 formed in the top wall of a governor controlled valve chamber 34. Inlet air passing through the control port 33 enters chamber 34 from where it flows through connecting passages 35 to the motor chamber to operate the motor.

The governor chamber is provided in a crowned cap section 36 of the housing. The cap section is removably attached by bolts over the top end of a lower section 37 in which the motor is housed. The control inlet port 33 is axially aligned with the rotor shaft.

During normal operation of the tool flow of supply air through the inlet port to the motor is regulated by means of a centrifugally operable governor controlled valve 38 so as to maintain the speed of the motor substantially at a predetermined safe rate (only half of the governor valve structure being shown for purposes of clarity of illustration).

The governor, which controls the movement of the valve relative to the inlet port, includes a hollow supporting body 41 having a stem depending into an axial recess of the rotor shaft and fixed by means of a threaded connection to the latter. The valve 38 is axially aligned with the inlet port and is slidably received in the body of the governor. A governor compression spring 43 surrounding a depending stem of the valve constantly biases the valve away from the inlet port to an open condition as in FIG. 1.

A pair of centrifugally operable governor weights 44 of L-form (one being shown) are pivotally supported in a radially extending collar or flange 45 (FIGS. 1, 3) of the governor body. A toe of each weight underlies a sleeve 46 which surrounds the governor body and is connected by means of a pin 47 with the valve. The pin extends through vertical guide slots in the governor body. Movement of the sleeve by the flyweights in response to centrifugal forces developed by the motor slides the valve against the return force of the spring into restricting relation to the inlet port.

If, for some reason, the governor should fail to function to control the flow of inlet air through the control port to the motor and, as a consequence, the speed of the motor should develop to an excessive rate, that is, a rate predetermined at a level above that of the governor controlled rate, a safety valve means will respond automatically to the increased speed to abruptly shut off further flow of operating air to the motor.

The safety valve means includes a flap or valve 48 in the form of a leaf spring (FIGS. 1, 2). The valve is anchored at one end 49 upon an internal shoulder of the housing. The opposite or free end of the valve extends into the inlet passage 32 above the inlet port. The valve has a closed position (not shown) in which its free end lies seated over the inlet port blocking flow of inlet air to the motor. The free end of the valve is normally stressed or held lifted from its closed position (as indicated in FIG. 1) by means of a releasably set trip pin 51.

The trip pin, in its set position, extends vertically parallel to both the axis of the governor body and the axis of a curved peripheral portion 50 (FIG. 3) of the flange part 45 of the governor body. The trip pin has a stem portion formed with a ball or spherical head 52 and a rounded bottom end. In its vertical or set position (as in FIG. 1) the bottom end of the pin engages in the manner of a detent in a slight depression or cavity provided in a seat 55. The seat is fitted in an internal shoulder of the housing. The head of the pin projects in part through a hole in the top wall of the governor chamber to a level above that of the upper or seat surface of the inlet port 33. The head of the set pin abuts against the underside of the spring valve so as to deflect and stress the free end of the valve upwardly to its open position relative to the inlet port. The downward force of the upwardly deflected valve acts upon the head of the trip pin to hold the latter firmly upon the seat 55 in erect position.

The force of the spring valve upon the pin, together with the detent engagement of the rounded bottom end of the pin in the slight cavity, normally prevents the pin from being dislodged or upset from its seat by the usual vibration attending the operation of the tool, or by the usual shocks to the tool occasioned by dropping or banging of the tool against a hard surface.

Centrifugally operable tripping means mounted to the periphery of the curved segment 50 of the governor flange is provided to strike and dislodge or upset the pin from its seat when the speed of the motor becomes excessive so as to enable the resilient valve spring to return to its closed condition over the inlet port.

The tripping means includes a curved leaf trip spring 56 (FIG. 3) which is anchored at one end to the curved surface of the flange. The curve of the spring conforms to the periphery of the flange; and the trip spring normally lies upon the latter. A trip weight 57 riveted to the outer surface of the free end of the trip spring projects radially from the latter.

The trip pin is located in its FIG. 1 set position in such manner that the radial dimension from the axis of the governor to the periphery of the stem of the pin is a little greater than the radial dimension from the axis of the body of the governor to the outer surface of the trip weight. In this manner, the pin is normally clear of the orbit or path of the trip weight 57 as the latter is carried about by the rotating body of the governor during normal operation of the tool.

The centrifugal forces that would cause the governor weights 44 to swing outwardly to actuate, in conventional manner, the governor valve during normal operation of the tool are insufficient to cause the trip weight 57 to fly out to strike the trip pin. If, however, should the speed of the motor develop to an excessive predetermined rate, the trip weight would be centrifugally thrown outwardly sufficiently to strike and dislodge the trip pin from its seat. With the upward stress or support of the pin thus removed, the spring valve will spring or snap downwardly to seat over the inlet port 33 to shut off further flow of operating air to the motor. As the spring valve moves to closed position, it presses upon the ball head 52 of the trip pin and pushes the latter downwardly through the pin guide hole 54 to one side of its seat 55 in a disabled condition.

Once the trip pin has been dislodged, the tool is inoperable until the trip pin is reset so as to reopen the spring valve relative to the inlet port. Before resetting the trip pin, an inspection of the tool would normally be made to determine the reason for the failure of the governor to operate; and any necessary repairs would be made.

The trip pin may be reset by unbolting and removing a cover plate 59 from the top of the housing cap. The spring valve is then manually lifted, and the trip pin is reseated underneath it. Reseating of the pin raises the spring valve to a level above the ceiling level of the cover plate 57. The cover plate, in being replaced, forces the free end of the spring valve slightly downward and thereby increases the downward holding tension of the spring valve upon the head of the trip pin.

While the invention has been illustrated and described in detail herein, it is to be expressly understood that the invention is not limited thereto. Various changes can be made in the design and arrangement of the parts thereof without departing from the spirit and scope of the invention. Accordingly, it is our intent to claim the invention not only as shown and described herein, but also in all such forms and modifications as may reasonably be construed to fall within the spirit of the invention and the scope of the appended claims.

We claim:

1. In a rotary tool including a housing, a rotary air motor, an inlet port for admitting operating air to the motor, and a safety valve controlling air flow through the port to the motor, a trip releasably supporting the valve in an open normal position, the valve being constantly biased against the trip in a closing direction, the trip being located at a predetermined radial distance from the axis of the motor, trip actuating means carried by the motor having response to a predetermined centrifugal force developed by the motor to move outwardly in a path of rotation in which the trip is located so as to cause the latter to be upset and as a consequence release its support from the valve, and the housing having first and second internal shoulders; wherein the safety valve is a leaf spring anchored at one end upon the first shoulder and having an opposite end resiliently movable from a position lying closed over the port to the open normal position; and wherein the trip is a pin having a bottom end releasably seated upon the second shoulder and having an upper end normally abutting an undersurface of the leaf spring between the ends of the latter and supporting the leaf spring in its open position.

2. In a rotary tool including a rotary air motor, an inlet port for admitting operating air to the motor, a first valve located to one side of the port normally controlling air flow through the port to the motor, a centrifugal governor carried by the motor regulating operation of the valve in response to development of a predetermined speed level of the motor, a resilient air shut-off safety valve located to the opposite side of the port having a first position in which it is closed over the port, a releasable trip normally stressing the safety valve from its closed position to a reverse open normal position, and trip actuating means carried by the motor having response to a predetermined centrifugal force developed by a higher level of speed of the motor to upset the trip and as a consequence release its stressing effect from the safety valve, including a housing having an internal shoulder, wherein the safety valve is a leaf spring anchored at one end to the shoulder and having an opposite free end which in the first position of the safety valve lies closed over the port, and including a second internal shoulder of the housing, wherein the trip is a pin having a bottom end releasably seated upon the latter shoulder and having an upper end abutting an undersurface of the safety valve between the ends of the latter.

3. In a rotary tool as in claim 2, wherein the second shoulder has a shallow depression, the pin has a rounded detent bottom end releasably seated in the depression and has a rounded top end abutting the undersurface of the safety valve.

4. In a rotary tool as in claim 3, wherein the rounded top end of the pin is in the form of a ball, the housing has an internal wall providing a hole the wall of which presents a bearing surface to the ball end of the pin, the ball being of a greater diameter than the pin.

5. In a rotary tool as in claim 4, wherein an upper end surface of the wall surrounding the port defines a seat for the safety valve, the free end of the safety valve is adapted to engage in its closed position upon the seat, and the trip pin has a set position in which its ball end abuts the safety valve at a level above that of the seat at which level the valve is deflected away from the seat.

6. In a rotary grinding tool including a rotary air motor having a rotor shaft adapted at a lower end for attachment to a grinding wheel, an inlet port for admitting live air to the motor, a first valve controlling air flow through the port to the motor, a speed governor attached to an upper end of the shaft responsive to development of a predetermined level of centrifugal force by the motor to regulate operation of the valve; a safety valve having one position in which it is closed upon the port shutting off air flow to the motor, and having a normal open position raised from the port allowing live air flow through the port to the motor, a releasable trip pin normally stressing the safety valve from its closed position to its open position, the valve being adapted upon release of the trip pin to return to its closed position, and flyweight tripping means carried by the governor having response to a predetermined higher level of centrifugal force developed by the motor to release the trip pin from the safety valve and as a consequence release its stressing force from the latter, wherein the safety valve is a leaf spring fixed at one end upon an internal shoulder of the housing of the tool and having an opposite free end movable to and from closing relation to the port; wherein the trip pin is disposed in parallel relation to the axis of the governor and in radial spaced relation thereto, and the flyweight tripping means comprises a spring fixed at one end to a body member of the governor and having a free end to which a weight is attached.

* * * * *